A. M. GRIFFIN.
COIL OF RUBBER HOSE AND THE PROCESS OF COILING.
APPLICATION FILED NOV. 1, 1920.
1,401,904.  Patented Dec. 27, 1921.
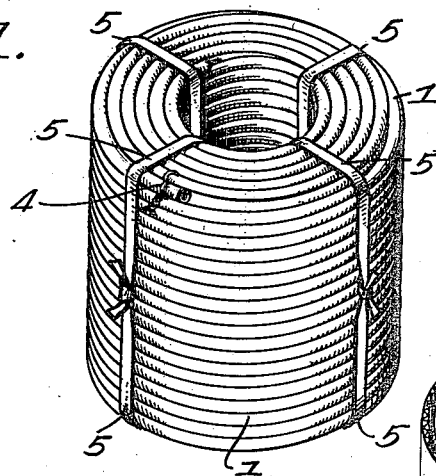
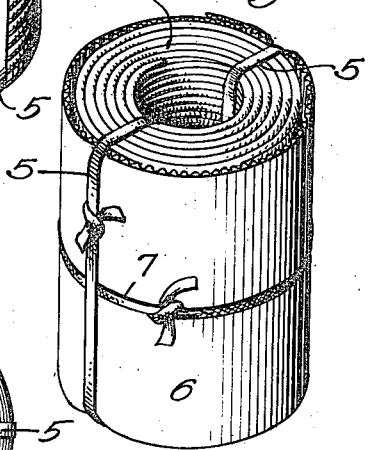
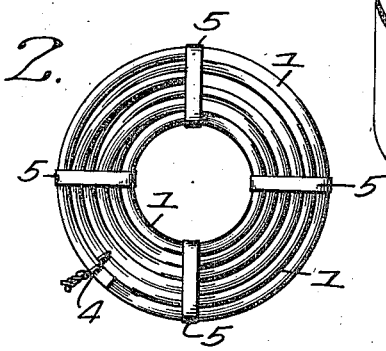
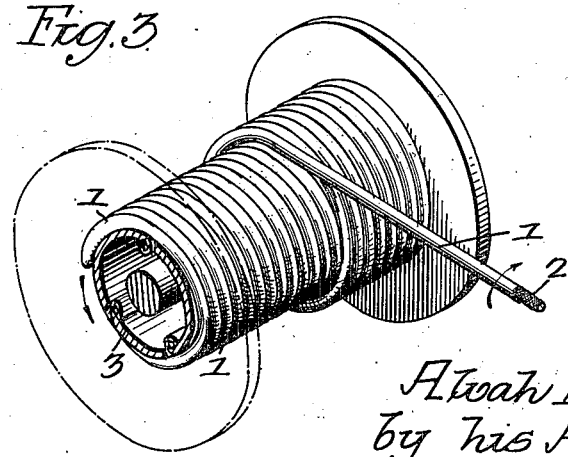
Inventor—
Alvah M. Griffin.
by his Attorneys—
Howson & Howson

UNITED STATES PATENT OFFICE.

ALVAH M. GRIFFIN, OF WILMINGTON, DELAWARE, ASSIGNOR TO THE ELECTRIC HOSE AND RUBBER COMPANY, OF WILMINGTON, DELAWARE, A CORPORATION OF DELAWARE.

COIL OF RUBBER HOSE AND THE PROCESS OF COILING.

1,401,904.  Specification of Letters Patent.  Patented Dec. 27, 1921.

Application filed November 1, 1920. Serial No. 421,204.

*To all whom it may concern:*

Be it known that I, ALVAH M. GRIFFIN, a citizen of the United States, residing in Wilmington, Delaware, have invented certain Improvements in a Coil of Rubber Hose and the Process of Coiling, of which the following is a specification.

One object of my invention is to dispense with the wooden reel usually employed in shipping rubber hose.

A further object of the invention is to make a coil of rubber hose, which will be self-supporting without a reel or holder.

A still further object of the invention is to make a coil in which the hose can be removed from the center of the coil without disturbing the remainder of the coil and, when removed, will be straight and without kinks.

In the accompanying drawings:

Figure 1 is a perspective view of a coil of rubber hose illustrating my invention;

Fig. 2 is a plan view of the coil;

Fig. 3 is a sectional perspective view illustrating the method of making the coil; and Fig. 4 is a perspective view showing the coil with a wrapper.

The ordinary method of winding rubber hose in considerable lengths, say 500 ft., is to use a wooden reel having a drum and heads made of slats. The hose is wound on this in the ordinary manner and is shipped to its destination on this reel. When a length of hose is sold from this reel, it is drawn from the outside of the coil and cut off, and the end temporarily tied to the remainder of the coil. The hose as it leaves the coil is twisted and kinked. The reel used for this purpose is expensive and if any of the slats forming the heads is broken while the hose is being transported, the hose is often damaged.

By my invention, I dispense entirely with the reel and coil the hose upon a spool from which it is afterward removed and fastened, as shown in Fig. 1.

Referring to the drawings, 1 is the rubber hose, of the type in which the fabric 2 is braided, as shown in Fig. 3. Hose of this character can be made in great lengths and it is the usual practice for the coil to contain 500 ft.

In making the coil in the manner shown in Fig. 3, at each revolution of the spool 3 a convolution is laid on the spool and the hose is given a twist to the right, as illustrated in said figure. This twist is opposite the natural twist given to the hose by coiling it on the spool. This places a torsional stress on the hose and the tendency of the coil is to move outward from the center of the spool, but the feeding of the hose wraps it closely on the spool.

When the second series of convolutions is wound on the first series, as shown in Fig. 3, the two series are wound close together, and the twisting of the hose is continued at, or about, each convolution, so that when the coil is made, as shown in Figs. 1 and 2, the entire hose is under torsional stress and by fastening the free end, as at 4, the coil is self-supporting. It can then be bodily removed from the spool 3, which may have a collapsible core and detachable heads. In order to prevent the several convolutions from becoming out of line, I preferably tie the coil with a series of tapes 5, which hold the outside convolutions in place.

In some instances, a wrapper 6 of corrugated paper, or other suitable material, may inclose the coil, and the wrapper may be held in place by any suitable fastening means, such as a tape 7.

While I have shown a spool with a certain form of collapsible core and detachable heads, the mechanical construction of the spool may be modified without departing from the essential features of the invention.

When it is desired to remove a length of hose from the coil, the inside end of the hose is withdrawn until the number of feet desired is reached, when the hose is severed without disturbance to the body of the coil.

When a length of hose is sold from the coil, it can be more readily handled than when the coil is mounted on a reel and when the hose is removed from the center of the coil it is straight and without the usual twists and kinks, which are present in hose coiled on a reel in the ordinary manner. This is due to the reverse twist put on the hose when wound on the spool. The twist may be given to the hose as it is wrapped on the spool, the spool rotating on its shaft, or the spool may be rotated on its shaft and also turned end for end to give the desired twist, without departing from the spirit of the invention.

It will be seen by the above method that the coil can be handled without the use of the retaining reel, consequently, the cost of preparing the coil for shipment is considerably reduced. The weight is also reduced to an appreciable extent, which materially lessens the cost of shipment. The space occupied by the coil is also reduced.

I claim:

1. As a new article of manufacture, a coil of rubber hose consisting of a series of convolutions, the outer end of the hose being held to the body of the coil and the hose having a torsional stress, which tends to force the inner convolutions outward so as to cause them to retain their position in the coil.

2. A coil of hose in which the convolutions are under torsional stress so that when a length of hose is removed from the center of the coil it will be straight and free from the usual twists and kinks.

3. The process herein described of forming a coil of hose, said process consisting in coiling the hose temporarily upon a spool and giving to the hose, at intervals, a twist so as to place a torsional stress upon the hose of the coil, causing the coil to retain its shape when the spool is removed.

4. The process herein described of forming a coil of rubber hose, said process consisting in coiling the hose temporarily on a spool, giving the hose a reverse twist at each convolution in order to place a torsional stress upon the hose, and finally fastening the outer end of the hose to the coil, the twist previously given to the hose tending to force the convolutions outward, thus retaining the several convolutions in position.

ALVAH M. GRIFFIN.